United States Patent [19]

Waldman et al.

[11] Patent Number: 4,811,428
[45] Date of Patent: Mar. 14, 1989

[54] WASHABLE AND DISPOSABLE BIB AND FABRIC FOR MANUFACTURING SAME

[75] Inventors: Harold L. Waldman, Yardley, Pa.; Charles B. Green, Spanish Fort, Ala.; A. Frederick Fowler, Lewisberg, Pa.; William F. Farr, Atmore, Ala.

[73] Assignee: International Paper Company, Purchase, N.Y.

[21] Appl. No.: 92,265

[22] Filed: Sep. 2, 1987

[51] Int. Cl.⁴ .............................................. A41B 13/10
[52] U.S. Cl. ..................................... 2/49 R; 2/243 A; 2/243 B
[58] Field of Search ............... 2/49 R; 8/922; 40/586; 446/28

[56] References Cited

U.S. PATENT DOCUMENTS

| | | | |
|---|---|---|---|
| 2,881,447 | 4/1959 | Shackelford | 2/49 R |
| 3,146,465 | 9/1964 | Hummel | 2/49 R |
| 3,328,807 | 7/1967 | Strauss | 2/49 R |
| 3,416,157 | 12/1968 | Marder et al. | 2/49 R |
| 3,525,104 | 8/1970 | Bonanno | 2/294 |
| 4,311,480 | 1/1982 | Price et al. | 8/922 |
| 4,365,353 | 12/1982 | Rayl | 40/586 |
| 4,475,250 | 10/1984 | Savin et al. | 2/49 R |
| 4,604,758 | 8/1986 | Grasberger et al. | 2/49 R |
| 4,620,323 | 11/1986 | Tepper | 2/49 R |
| 4,649,572 | 3/1987 | Roessler | 2/49 R |
| 4,660,225 | 4/1987 | Kahn | 2/49 R |
| 4,660,226 | 4/1987 | Quilling et al. | 2/49 R |
| 4,663,779 | 5/1987 | Bible | 2/49 R |
| 4,706,303 | 11/1987 | Van Gompel et al. | 2/49 R |

OTHER PUBLICATIONS

Maurice Gershman, The Journal of the American Medical Association, "Self Adhering Nylon Tapes", p. 930, vol. 16, No. 7, dated: Oct. 19, 1958.
American Threshold Industries, Inc., Asheville, NC–product packaging for Dribbles brand disposable baby bibs (date unknown).
Alpha-bibs Corp, Wayne, Pa.–product packaging for Alpha-Bibs brand disposable bibs (date unknown).

*Primary Examiner*—Werner H. Schroeder
*Assistant Examiner*—Jeanette E. Chapman
*Attorney, Agent, or Firm*—Walt Thomas Zielinski

[57] ABSTRACT

A bib for children is fabricated of a thermally bonded laminate of vinyl film and polyester fabric materials. The laminate is provided with an embossed finish which is abrasion resistant and washable. A water based, non-leaching acrylic ink is applied to the embossed finish for ornamentation. The bid includes a body portion having interior vinyl and outer polyester sides, top and bottom peripheral edges, and side edges. First and second neck fastening members extend from the top peripheral edge and terminate at overlapping ends which include synthetic hook and loop fastener elements. The bib also includes a pocket formed by a panel which overlies and is thermally sealed to the body portion. A durable pocket construction is provided by employing reinforcing thermal seals to secure the pocket panel to the body portion.

17 Claims, 2 Drawing Sheets

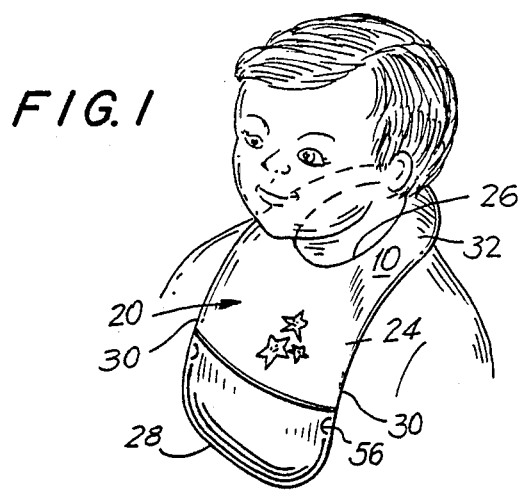
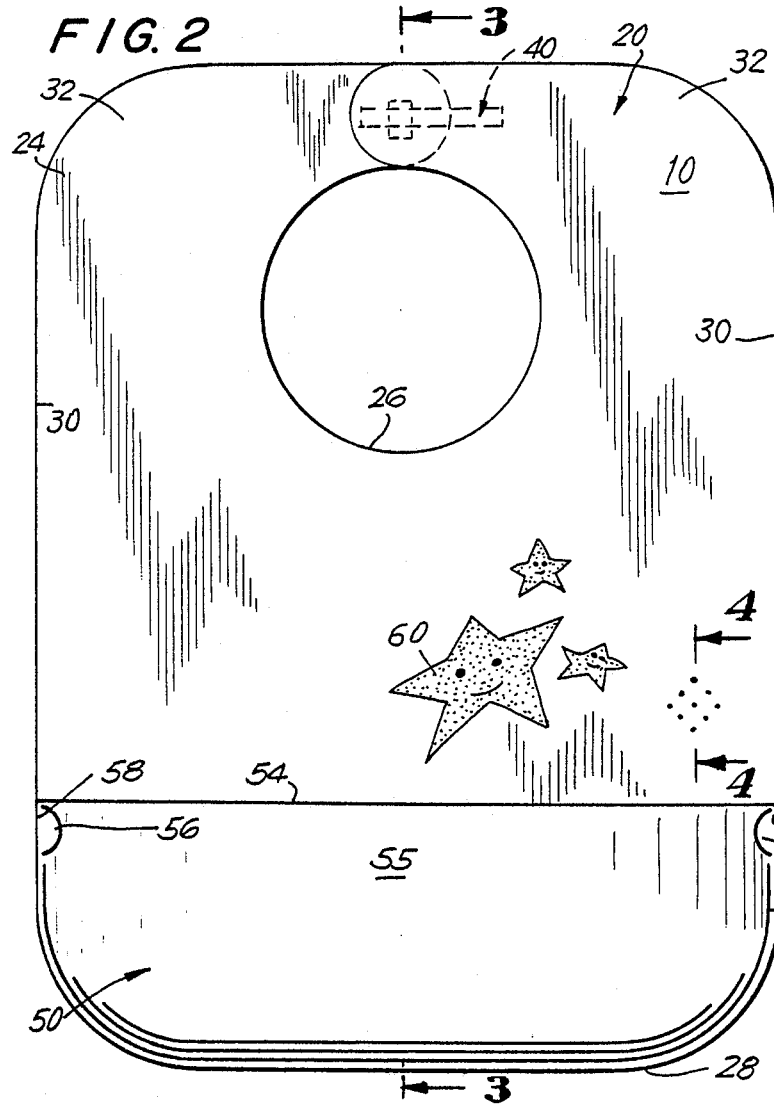
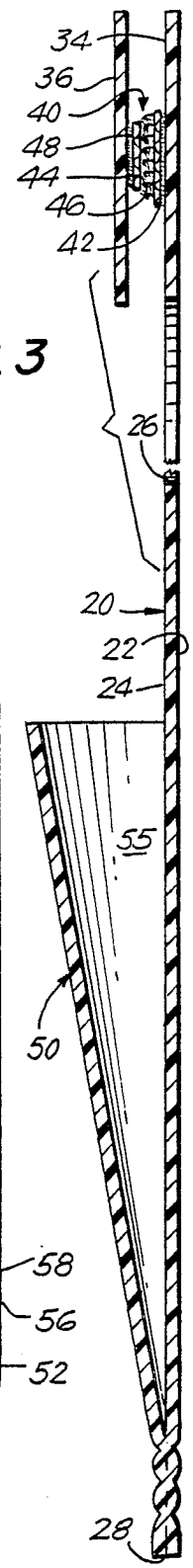

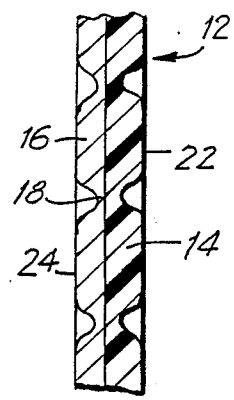
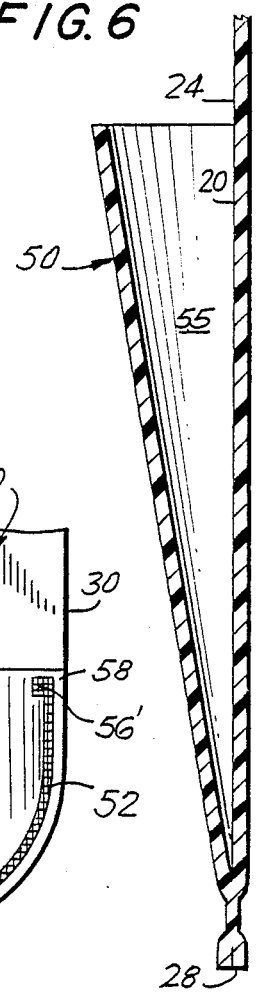
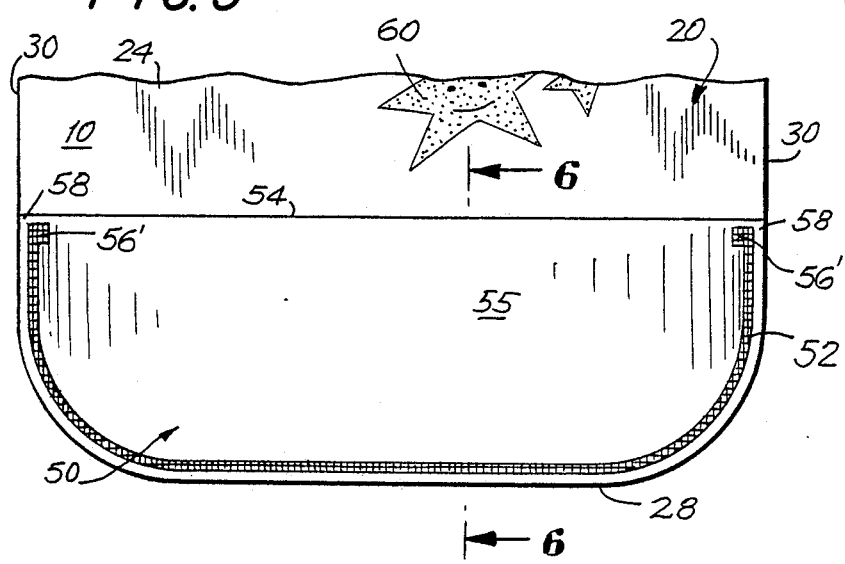

WASHABLE AND DISPOSABLE BIB AND FABRIC FOR MANUFACTURING SAME

DESCRIPTION

1. Field of the Invention

This invention generally relates to a disposable bib for use by children and, more particularly an ornamented, flame-retardant, nontoxic and nonallergenic fabric and bib design which incorporates improved neck fastener and pocket features.

2. Background Art

Laminate materials which include moisture barrier and fabric layers having application in the health field are known in the prior art. Such laminates have particular application in the design of bibs because their component materials may be selected to meet both flame retardant and hypoallergenic specifications required in infant products. Laminates are also economical permitting their use in disposable products and offer the further advantage of being washable.

The art has recognized the need to provide a bib which incorporates an effective and nonobstructive neck fastener and pocket design to catch food droppings. American Threshold Industries, Inc. of Asheville, N.C., markets a disposable bib which employs a refastenable neck tape. A pocket is formed by a fold and lower edge seal in a body portion of the bib.

In practice, the American Threshold design has not proved satisfactory in that the pocket is narrowed by its infolded configuration. The tap neck fastener does not provide an effective reclosable seal, and the fabric laminate is not washable.

Other commercial designs and laminates are characterized by similar limitations. Known approaches have also failed to employ laminates having sufficient durability and tear strength.

The present invention is directed to an improved disposable ornamented fabric bib which incorporates a synthetic hook and loop neck fastener and a wide bodied pocket which lies in open orientation for receiving food droppings. The bib is fabricated of an improved durable polyester and vinyl laminate which has a puckered exterior finish for enhanced softness. It will be recognized that such features in combination will enhance prior art approaches and meet a need of the health care industry.

Accordingly, it is a broad object of the invention to provide an improved ornamented fabric laminate which is durable and has application in infant bibs.

A more specific object of the invention is to provide a bib construction including an improved neck fastener and pocket configuration.

DISCLOSURE OF THE INVENTION

In the present invention, these purposes, as well as other which will be apparent, are achieved generally by providing a bib for children which is fabricated of a thermally bonded laminate of vinyl and polyester fiber materials. The bib includes a body portion having interior vinyl and outer polyester sides, top and bottom peripheral edges, and side edges. First and second neck fastening members extend from the top peripheral edge and terminate at overlapping ends which are fastened around the child's neck. The bib also includes a pocket formed by a panel which overlies and is thermally sealed to the body portion to define a compartment.

In a preferred embodiment of the invention the laminate includes an interior vinyl surface which has a tafeta finish, and a polyester nonwoven fabric exterior which has an embossed or puckered finish for enhanced softness. The preferred exterior finish is provided by laminating the polyester fabric to a tensioned vinyl which is stretched within its elastic limits. When tension on the vinyl is released, the polyester fabric gathers or puckers to provide a versatile laminate which is suitable for fabricating the bib of this invention. A water based, non-leaching acrylic ink is applied to the exterior nonwoven fabric for ornamentation. Versatility in application of the laminate is obtained by employing vinyl and fabric materials which are abrasion resistant and washable.

A refastening feature is provided by synthetic hook and loop panels which are attached to the overlapping ends of the neck fastening members. Further advantage is obtained in this embodiment by employing reinforcing thermal seals at point where a terminal edge of the pocket panel intersects the side edges of the body portion.

Other objects, features and advantages of the present invention will be apparent when the detailed description of the preferred embodiment is considered in conjunction with the drawings, which should be construed in an illustrative and not limiting sense, as follows:

BRIEF DESCRIPTION OF THE DRAWINGS

FIG. 1 shows a perspective view of a bib fabricated of a laminate of the invention fastened around a child's neck;

FIG. 2 is a front elevational view of the bib showing a neck fastening closure in phantom and a first heat sealing structure for attaching a pocket panel to a body portion;

FIG. 3 is a vertical cross-sectional view taken along the line 3—3 of FIG. 2;

FIG. 4 is a vertical cross-sectional view taken along the line 4—4 of FIG. 2;

FIG. 5 is a partial front elevational view of the bib showing an alternative heat seal structure for attachment of the pocket panel; and FIG. 6 is a vertical cross-sectional view taken along the line 6—6 of FIG. 5.

BEST MODE OF CARRYING OUT THE INVENTION

Referring now to the drawings, a bib, generally designated 10, which is fabricated of a laminate of vinyl and polyester fiber materials 12 is illustrated in FIGS. 1–6. The laminate is flame-retardant, nontoxic and nonallergenic for advantage in child care applications.

The bib 10 includes a body portion 20 which has interior vinyl and outer polyester sides 22, 24, top and bottom peripheral edges 26, 28, and side edges 30. First and second neck fastening members 32 extend from the top peripheral edge 26 and terminate at overlapping ends 34, 36 which are fastened around the child's neck. An adjustable fastener 40 permits adjustment of the neck size and provides a refastening feature.

In the preferred embodiment of the invention, fastener 40 includes a fastening panel 42 carried on an exterior surface of overlapping end 34 and a cooperating fastening panel 44 carried on an interior surface of overlapping end 36. Fastening panels 42, 44, which are thermally bonded to the bib, are fabricated of conventional synthetic fastening materials. Panel 42 includes a plurality of hooks 46 which adhesively engage loops 48 of panel 44.

A pocket panel 50 including a boundary edge 52, and open terminal edge 54 is thermally sealed to the bottom peripheral edge 28 and portions of the side edges 30 to define an open ended pocket 55. The thermal seal may be effected by conventional processes. For example, dielectric heating and a hot melt, such as ethylene vinyl acetate, may be employed as an adhesive. Pocket panel 50 is arranged with the vinyl layer of the laminate material 12 facing the outer side 24 of the body portion. As best shown in FIG. 3, the pocket panel 50 is dimensioned so that it assumes an open orientation when in use. This arrangement provides an effective receptacle for food droppings.

For durability the pocket panel 50 is reinforced with enlarged thermal seal areas 56 located at opposing ends 58 of the terminal edges 54. The seal areas 56 attach the pocket panel 50 to the side edges 30 of the body portion 20 at points where the terminal ends 58 overlie the side edges 30 of the body portion.

FIG. 2 shows a first embodiment of the invention in which the seal areas 56 have a semi-circular configuration. An alternative embodiment, illustrated in FIG. 5, employs seal areas 56' which have a generally rectangular configuration.

In the preferred embodiment the laminate 12 includes an interior layer 14 fabricated of polyvinyl chloride (PVC) which is ultrasonically bonded to an exterior layer 16 of polyethylene terephthalate. The vinyl film layer 14 is preferably a standard juvenile quality white vinyl having a thickness of 2 mil. Points of adhesion between the interior and exterior layers 14, 16 are designated 18 in FIG. 4.

Interior layer 14 preferably has a durable tafeta finish. The exterior layer 16 is provided with an embossed or puckered finish for enhanced laminate softness and absorbency. To obtain the preferred laminate texture, the polyester fabric layer 16 is laminated to a tensioned vinyl which elastically stretches. When tension on the vinyl is released the polyester fabric gathers or puckers to provide a versatile laminate which is suitable for fabricating the bib of this invention.

Further advantage in the invention is obtained by applying ornamentation 60 to the exterior layer 16 with a water based, non-leaching acrylic ink. See FIG. 2. Flexographic ink has been found to be particularly effective for use in applying the ornamentation.

Various tests were performed on the preferred PVC and polyethylene terephthalate laminate of the invention to measure its optimum specifications and properties. Characteristics of the preferred laminate are as follows:

| Test | Result | Test Method |
|---|---|---|
| Basis Weight | 90 g/yd$^2$ | ASTMD-1910-64 |
| Thickness | 0.0217 inch | ASTMD-1777-64 |
| Breaking Tensile | Machine Direction 16.8 lbs. | ASTMD-1682-64 |
| | Cross Direction 11.4 lbs. | |
| Water Drop Penetration | 0.70 sec | AATCC39-1974 |
| Flame Retardancy | MD and CD - DNI (Does not ignite) | ASTMD-1230-72 |
| Spray Rating | 0 | AATCC-22-1980 |
| Run-off Grams | 10 grams | Non-Standard |
| Mullen Burst | 22 psi | ASTMD-774-67 |
| Washing & Drying Resistance | Excellent After 5 Cycles | AATCC135-1978 |

The flame retardancy test was performed by exposing the laminate to a flame for 12 seconds in accordance with specified standards. The laminate did not ignite in either machine or cross directions. Washing resistance was measured by visual observation based upon a comparison of the laminate with an unwashed standard. The excellent rating indicates that the laminate showed no physical deterioration, such as delamination, loss of shape, or shrinkage.

From the foregoing, it will be appreciated that the invention achieves the objectives stated heretofore. There is provided a disposable and washable bib 20 which may be readily fastened and removed from a child's neck. A reinforced pocket design which extends across the width of the bib effectively catches food droppings. Still further advantage is obtained by employing a laminate having an exterior ornamented finish.

Numerous modifications are possible in light of the above disclosure. For example, the preferred laminate is fabricated of PVC and polyethylene terephthalate layers 14, 16. It will be recognized by those skilled in the art that the interior layer 14 may be fabricated of high or low density polyethylenes, an EVA, or a polypropylene polymer. Similarly, the exterior layer 16 may be fabricated of polyethylene terephthalate, polypropylene fibers or their blends with naturally absorbent fibers such as rayon, and cotton. The exterior layer may also be fabricated of fibers which have enhanced absorbency. For example, Superinflated (SI) brand rayon manufactured by Courtaulds North America Inc., New York, N.Y., or polyacrylate superabsorbent fiber made by Japan Explan Co., Ltd., Osaka, Japan, and marketed under the brand name LANSEAL F.

It is to be understood, therefore, that the above-described embodiments are merely illustrative, and other embodiments may be devised by those skilled in the art, without departing from the spirit or scope of the present invention, as set forth in the appended claims.

We claim:

1. A disposable bib fabricated of a thermally bonded laminate of vinyl and polyester fiber layers, said bib comprising:

a body portion having interior and outer sides, top and bottom peripheral edges, and side edges, said interior and outer sides respectively being formed by the vinyl and polyester layers of the laminate;

first and second neck fastening members which extend integrally from said top peripheral edge and terminate at overlapping ends;

fastening means for removably and adjustably securing said overlapping ends;

a pocket panel including a boundary edge which overlies and is thermally sealed to said bottom peripheral edge and portions of said side edges, said pocket panel being arranged with the vinyl layer facing said outer side of the body portion, said pocket panel also having an open terminal edge which forms a pocket compartment; and reinforcing means for sealing said terminal edge of said pocket panel to said side edges of said body portion to provide a durable pocket construction, said reinforcing means including enlarged sealing areas located at opposing ends of said terminal edge at points where said boundary and terminal edges intersect with said side edges of said body portion and extending inwardly from said side edges by a small distance along said terminal edge, whereby the sealing of said opposing ends of said terminal edge is reinforced to a greater extent at points of greater stress between said body portion and said pocket panel.

2. A disposable bib according to claim 1, wherein the thermally bonded laminate includes ornamentation, said ornamentation being formed by applying a water based solvent ink to said polyester layer.

3. A disposable bib according to claim 1, wherein the vinyl and polyester layers respectively have tafeta and puckered finishes, said laminate being washable and abrasion resistant.

4. A disposable bib according to claim 1, wherein in said sealing means comprises rectangular thermal seal areas between said pocket panel and said side edges at points where said boundary and terminal edges intersect.

5. A disposable bib according to claim 1, wherein in said sealing means comprises semi-circular thermal seal areas between said pocket panel and said side edges at points where said boundary and terminal edges intersect.

6. A disposable bib according to claim 4, wherein the laminate is formed by an ultrasonic bonding process, the polyester layer has an embossed finish which is abrasion resistant and washable, and the thermally bonded laminate includes a water based, non-leaching, acrylic ink ornamentation.

7. A disposable bib according to claim 6, wherein said fastening means includes complimentary first and second fastening panels fabricated of a synthetic adhesive material, said panels respectively being attached to said first and second overlapping ends, said first and second fastening panels respectively including hooks and loops which adhesively engage one another.

8. A disposable bib according to claim 5, wherein the laminate is formed by an ultrasonic bonding process, the polyester layer has an embossed finish which is abrasion resistant and washable, and the thermally bonded laminate includes a water based, non-leaching, acrylic ink ornamentation.

9. A disposable bib according to claim 8, wherein said fastening means includes complimentary first and second fastening panels fabricated of a synthetic adhesive material, said panels respectively being attached to said first and second overlapping ends, said first and second fastening panels respectively including hooks and loops which adhesively engage one another.

10. A disposable bib according to claim 7, wherein the vinyl layer is a film of polyvinyl chloride (PVC), and the polyester fabric layer is polyethylene terephthalate.

11. A disposable bib according to claim 9, wherein the vinyl layer is a film of polyvinyl chloride (PVC), and the polyester fabric layer is polyethylene terephthalate.

12. A disposable bib fabricated of a bonded laminate including layers of vinyl film and nonwoven polyester fabric, said bib comprising:
 a body portion having interior and outer sides, top and bottom peripheral edges, and side edges, said interior and outer sides respectively being formed by the vinyl and polyester layers of the laminate;
 first and second neck fastening members which extend integrally from said top peripheral edge and terminate at overlapping ends;
 fastening means for removably securing said overlapping ends, said fastening means including complementary first and second fastening panels respectively being attached to said first and second overlapping ends;
 a pocket panel including a boundary edge which overlies and is thermally sealed to said bottom peripheral edge and portions of said side edges, said pocket panel being arranged with the vinyl layer facing said outer side of the body portion, said pocket panel also having an open terminal edge which forms a pocket compartment; and
 reinforcing means for sealing said terminal edge to said side edges to provide a durable pocket construction, said reinforcing means including enlarged thermal seal areas between said pocket panel and said outer side at points where said boundary and terminal edges intersect,
 wherein said laminate is formed of a vinyl film layer having a durable tafeta finish on the interior side laminated to a nonwoven polyester fabric layer having an embossed finish on the outer side of said body portion, said polyester fabric layer being bonded at a plurality of distributed bonding points to the vinyl film layer while it is tensioned to stretch elastically and which is then released so that the polyester fabric layer gathers or puckers to provide an embossed, puckered finish on said outer side of said body portion for enhanced softness and absorbency.

13. A disposable bib according to claim 12, further comprising a water based, non-leaching, acrylic ink ornamentation applied to the embossed exterior of the laminate.

14. A laminate according to claim 12, wherein the vinyl and polyester fabric layers are ultrasonically bonded together.

15. A laminate according to claim 12, wherein the vinyl film is polyvinyl chloride (PVC), and the polyester fabric layer is polyethylene terephthalate.

16. A laminate according to claim 15, further comprising a water based, non-leaching, acrylic ink ornamentation.

17. A lamination according to claim 16, wherein the thermal bonding is effected by an ultrasonic bonding process.

* * * * *